MULTIPLEX MAGNETIC RECORDING AND REPRODUCING SYSTEM

Filed Jan. 31, 1961 4 Sheets-Sheet 1

Inventors
Saburo Uemura
Shoichi Muramoto by Hill, Sherman, Meroni, Gross & Simpson Attys.

Oct. 12, 1965 SABURO UEMURA ETAL 3,211,841

MULTIPLEX MAGNETIC RECORDING AND REPRODUCING SYSTEM

Filed Jan. 31, 1961

4 Sheets-Sheet 2

Inventors
Saburo Uemura
Shoichi Muramoto by Hill, Sherman, Meroni, Gross & Simpson Attys.

Oct. 12, 1965 SABURO UEMURA ETAL 3,211,841

MULTIPLEX MAGNETIC RECORDING AND REPRODUCING SYSTEM

Filed Jan. 31, 1961 4 Sheets-Sheet 3

Inventors
Saburo Uemura
Shoichi Muramoto by Hill, Sherman, Meroni, Gross & Simpson Attys.

Inventors
Saburo Uemura
Shoichi Muramoto by Hill, Sherman, Meroni, Gross & Simpson Attnys.

United States Patent Office 3,211,841

Patented Oct. 12, 1965

3,211,841

MULTIPLEX MAGNETIC RECORDING AND REPRODUCING SYSTEM

Saburo Uemura, Nakano-ku, and Shoichi Muramoto, Meguro-ku, Tokyo, Japan, assignors to Sony Corporation, a corporation of Japan Filed Jan. 31, 1961, Ser. No. 86,187
Claims priority, application Japan, Feb. 5, 1960, 35/3,655
8 Claims. (Cl. 179—100.2)

This invention relates to a signal transmission system and more particularly to a signal transmission system having a modulation system which converts amplitude variations in input signals into phase changes in the leading and trailing edges of squarewave signals and subsequently converts such phase changes back into amplitude variations in output signals.

The invention was evolved with the general object of providing an improved multiplex magnetic recording and reproducing system wherein a plurality of intelligence signals might be recorded and subsequently reproduced using a minimum number of transmission channels while having minimum distortion and high reliability. It will be appreciated, however, that many features of the invention are applicable to other types of transmission systems.

An important advantage of the invention is that a plurality of intelligence signals can be transmitted using a minimum number of channels. For example, three signals can be recorded and subsequently reproduced, using only two channels of a magnetic tape. Five signals can be transmitted using only three channels, and seven signals can be transmitted using only four channels, etc.

Another important advantage is that distortions produced in the system are minimized and the system is comparatively insensitive to amplitude variations and extraneous signals. At the same time, the system requires no critical or precision components and yet it is highly reliable.

An important feature of the invention is in the generation of a squarewave signal wherein the phase of the leading edges in the signal is controlled in accordance with the amplitude of one input signal while the phase of the trailing edges is controlled in accordance with the amplitude of a separate input signal. Thus two signals may be transmitted on a single channel.

Another important feature of the invention is in the generation of a separate squarewave signal wherein one series of edges, either the trailing edges or the leading edges, are generated at regular intervals and in such relation to the other squarewave signal as to provide a reference for subsequent reproduction.

Another feature is in the use of the other set of edges of the second squarewave signal to transmit, through phase modulation thereof, a third signal.

A further feature of the invention is in the system utilized for generating the squarewave signals.

Still another feature is in a reproducing system for responding to such signals, to obtain accurate reproduction.

A still further feature of the invention is in the storage of signals on a record medium, in such fashion that the number of tracks or channels that are required is minimized and in such fashion that the signal storage is comparatively insensitive to handling of the record medium and the storage life is indefinite.

This invention contemplates other objects, features and advantages which will become more fully apparent from the following detailed description taken in conjunction with the accompanying drawings which illustrate a preferred embodiment and in which.

In general, the illustrated magnetic recording reproducing system is used for converting audio signals or the like from three signal sources I, II and III into two squarewave signals which are recorded on adjacent tracks of a magnetic tape, and for subsequently converting the squarewave signals from the tape into signals which faithfully follow the amplitude variations of the audio signals or the like applied from the three signal sources I, II and III.

Figure 2:
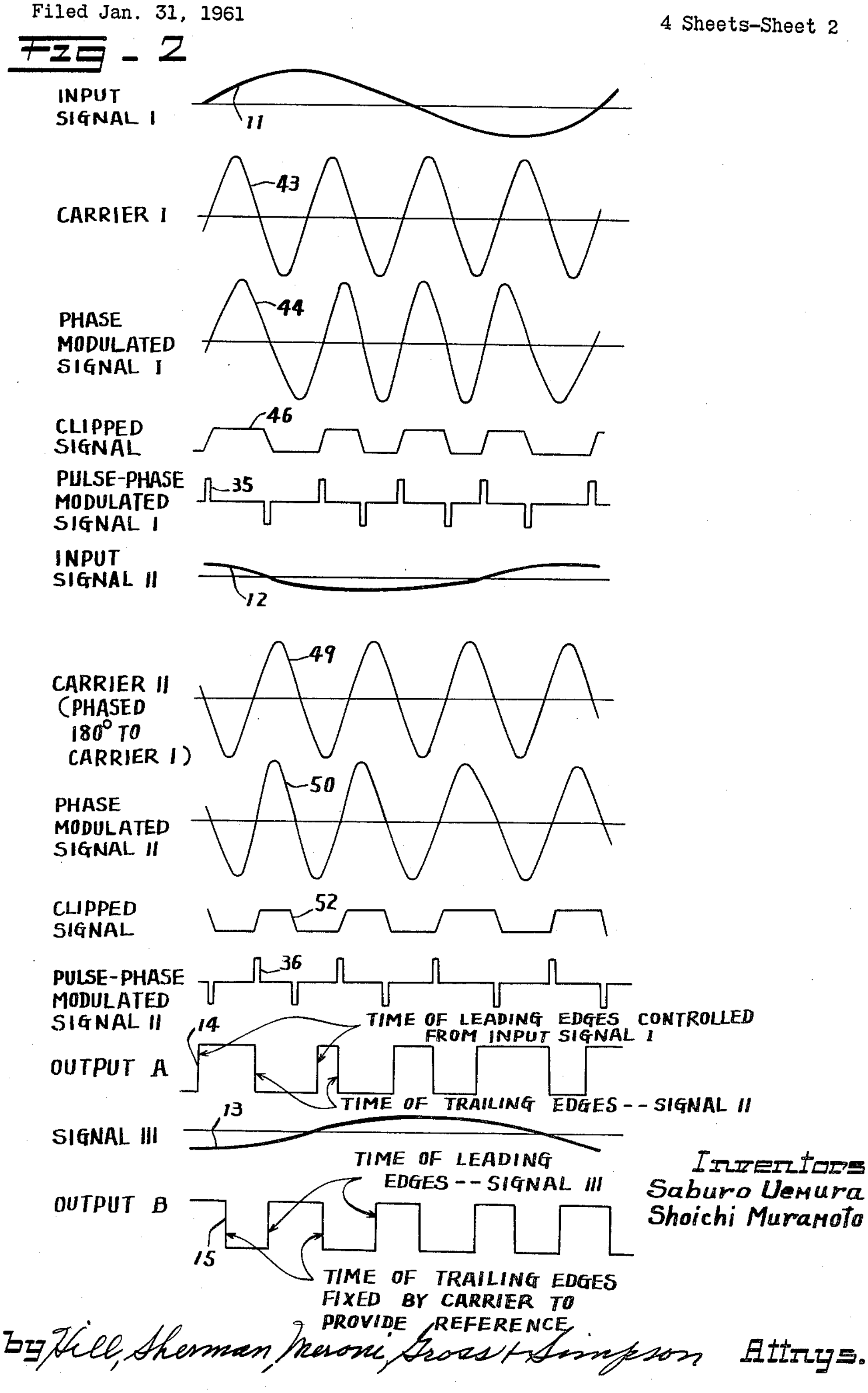
FIGURE 2 is a graph showing waveforms produced at various points in the circuit of FIGURE 1.

Referring first to FIGURE 2, curves 11, 12 and 13 show the waveforms which might be developed by the signal sources I, II and III respectively. Curves 14 and 15 show squarewaves which are developed from the signals 11–13 and are applied to "A" and "B" channels of a multiple channel tape recorder. In the illustrated arrangement, the trailing edges of the waveform 15 are generated from an unmodulated, fixed-frequency carrier wave so as to occur at regular intervals of time, and such trailing edges of the waveform 15 are used as a reference. The leading edges of the waveform 15 are shifted in phase in accordance with the amplitude of the signal from source III (illustrated by curve 13), a leading phase shift being produced as the signal shifts in a positive direction and a lagging phase shift being produced as the signal shifts in a negative direction. In the waveform 14, the leading edges are shifted in phase, in relation to the reference provided by the trailing edges of the waveform 15, in accordance with the amplitude of the input signal I, while the trailing edges are shifted inphase in accordance with the amplitude of the input signal II.

The squarewave signals illustrated by curves 14 and 15 are applied to a pair of recording heads 16 and 17 (FIGURE 1) to record the signals on adjacent channels of a magnetic tape 18. Subsequently, a pair of reproducing heads 19 and 20 (FIGURE 3) pick up the signals and in the reproducing system illustrated in FIGURE 3, three flip-flops I, II and III are controlled by pulses generated from the leading and trailing edges of the squarewaves, to generate squarewave signals shown by curves 21, 22 and 23 in FIGURE 4. Such signals are applied to filtering or averaging circuits 24, 25 and 26 to develop output signals which vary in amplitude as indicated by dotted line curves 27, 28 and 29 in FIGURE 4. It will be observed that the amplitudes of such signals vary in the same way as the amplitudes of the input signals I, II and III.

Figure 1:
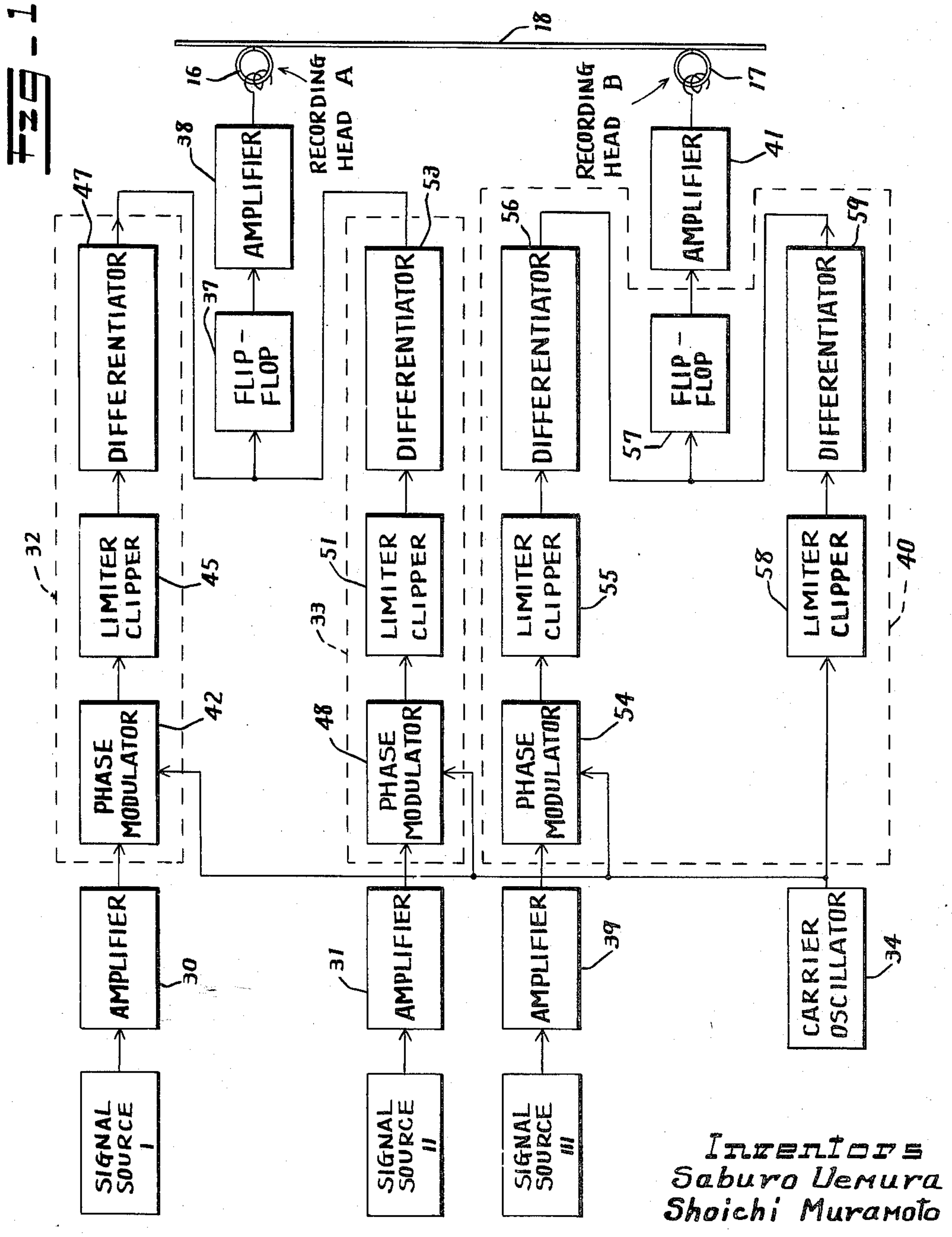
FIGURE 1 is a schematic diagram of a recording system constructed according to the principles of this invention.

Referring now to FIGURE 1, the input signals I and II (shown by curves 11 and 12 in FIGURE 2) are respectively applied from the signal sources I and II to amplifiers 30 and 31, the outputs of which are applied to a pair of pulse-phase modulation circuits 32 and 33. The pulse-phase modulation circuits 32 and 33 receive carrier signals from a carrier oscillator 34, and develop pulse-phase modulated waves as shown by curves 35 and 36 in FIGURE 2. These pulse-phase modulated signals are applied to a common flip-flop circuit 37, which is triggered by positive pulses from both of the pulse-phase modulation circuits 32 and 33, the flip-flops 37 being triggered to one condition by positive pulses in the signal 35 from modulator 32 and being triggered to the opposite condition by pulses in the signal 36 from the modulator 33. In this way, the wave 14 is obtained, the leading and trailing edges of which are controlled by the amplitudes of the input signals. This output signal may be applied directly or through an amplifier 38 to the recording head 16 for the "A" channel.

At the same time, the input signal III from signal source III is amplified by an amplifier 39 and applied to a pulse width modulation circuit 40, which receives carrier wave signals from the carrier oscillator 34. The modulation circuit 40 develops the squarewave output shown by curve 15 in FIGURE 2 which is applied either directly or through an amplifier 41 to the recording head 17 for the "B" channel.

The pulse phase modulator circuit 32 may comprise a conventional phase modulator 42 which responds to the input signal I, shown by curve 11 in FIGURE 2, and to a sine wave signal from the carrier oscillator 34, shown by a curve 43 in FIGURE 2, to develop a phase-modulated signal shown by curve 44 in FIGURE 2. This signal is applied to a conventional limiter-clipper circuit 45 to develop a clipped signal having a waveform as shown by curve 46 in FIGURE 2. The clipped signal is applied to a conventional differentiator circuit 47, such as a short time-constant resistor-capacitor circuit, to develop a pulse output as shown by waveform 35, which applied to the flip-flop 37.

Similarly, the pulse phase modulator circuit 33 may comprise a phase modulator 48 which responds to the input signal II having the waveform 12 as indicated in FIGURE 2, and to a sine wave signal from the carrier oscillator 34 having a waveform as indicated by reference numeral 49 in FIGURE 2, to develop a phase modulated signal as indicated by reference numeral 50 in FIGURE 2. This signal is applied to a limiter-clipper circuit 51 to develop a clipped signal 52 which is applied to a differentiator circuit 53 to develop the pulse signal 36.

The pulse width modulator 40 may use similar components. In particular, the input signal III, after amplification by amplifier 39, is applied to a phase modulator 54 along with a signal from the carrier oscillator 34. The output of the phase modulator 54 is applied through a limiter-clipper circuit 54 to a differentiator circuit 56. Thus modulator 54, limiter-clipper circuit 55 and differentiator circuit 56 form a pulse-phase modulator similar to the modulators 32 and 33. Output pulses therefrom are applied to a flip-flop circuit 57 which generates the waveform 15, the leading edges of the output squarewaves from the flip-flop 57 being determined by positive pulses from the differentiator circuit 56. To determine the trailing edges of the output of flip-flop 57, a signal from the carrier oscillator 34 is applied directly to a limiter-clipper circuit 58 which is connected through a differentiator circuit 59 to the flip-flop circuit 57.

It may be observed that the carrier wave signals 43 and 49, respectively applied to the phase modulators 32 and 33 are 180° out of phase in order that the positive pulses from modulator 32 may fall approximately between positive pulses from the modulator 33, and thus obtain proper operation of the flip-flop 37. If desired, however, the applied carrier wave signals might be in phase, and the flip-flop 37 might be arranged to respond to positive pulses from one modulator and negative pulses from the other.

It is also observed that to produce the illustrated waveform 15 from the pulse width modulator 40, the signals applied thereto from the carrier oscillator 34 are approximately 90° out of phase with respect to the signals applied to the modulators 32 and 33. This phase relation is not necessarily required, but may be necessary or desirable, depending upon the manner of operation of the reproducing section, as will be made clear hereinafter.

Figure 3:
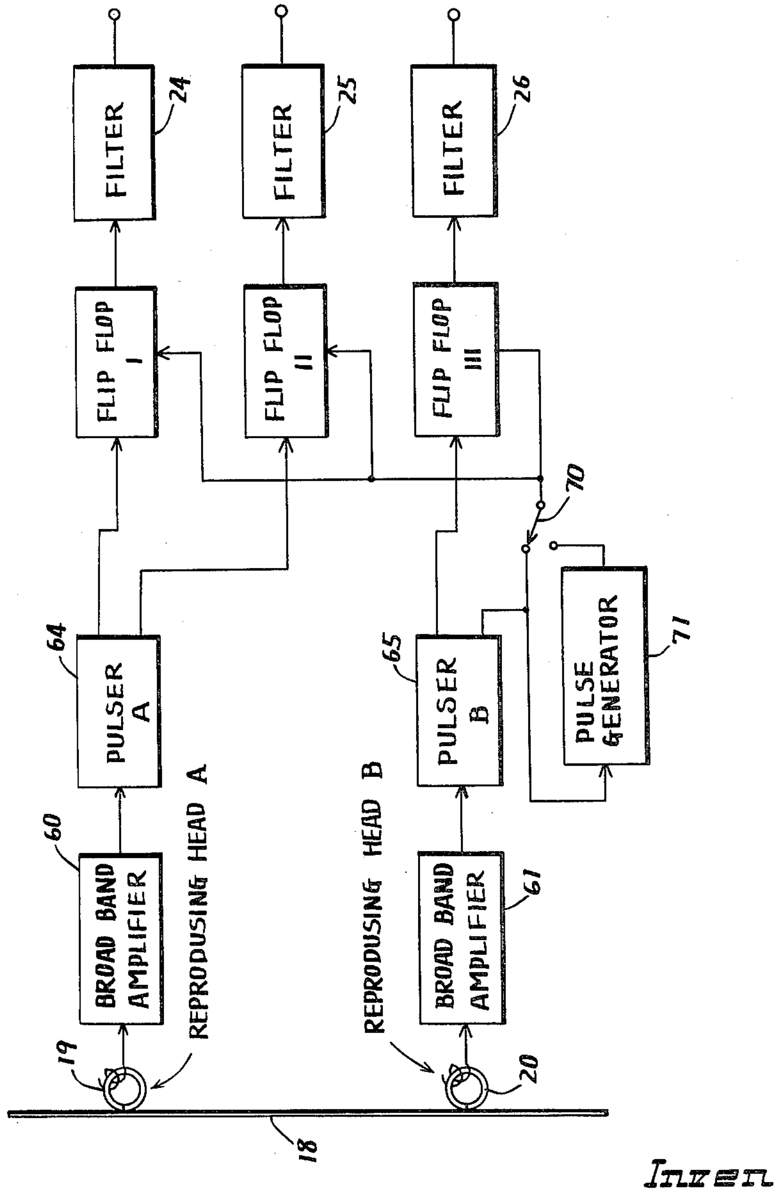
FIGURE 3 is a schematic diagram of a reproducing system constructed according to this invention.
Figure 4:
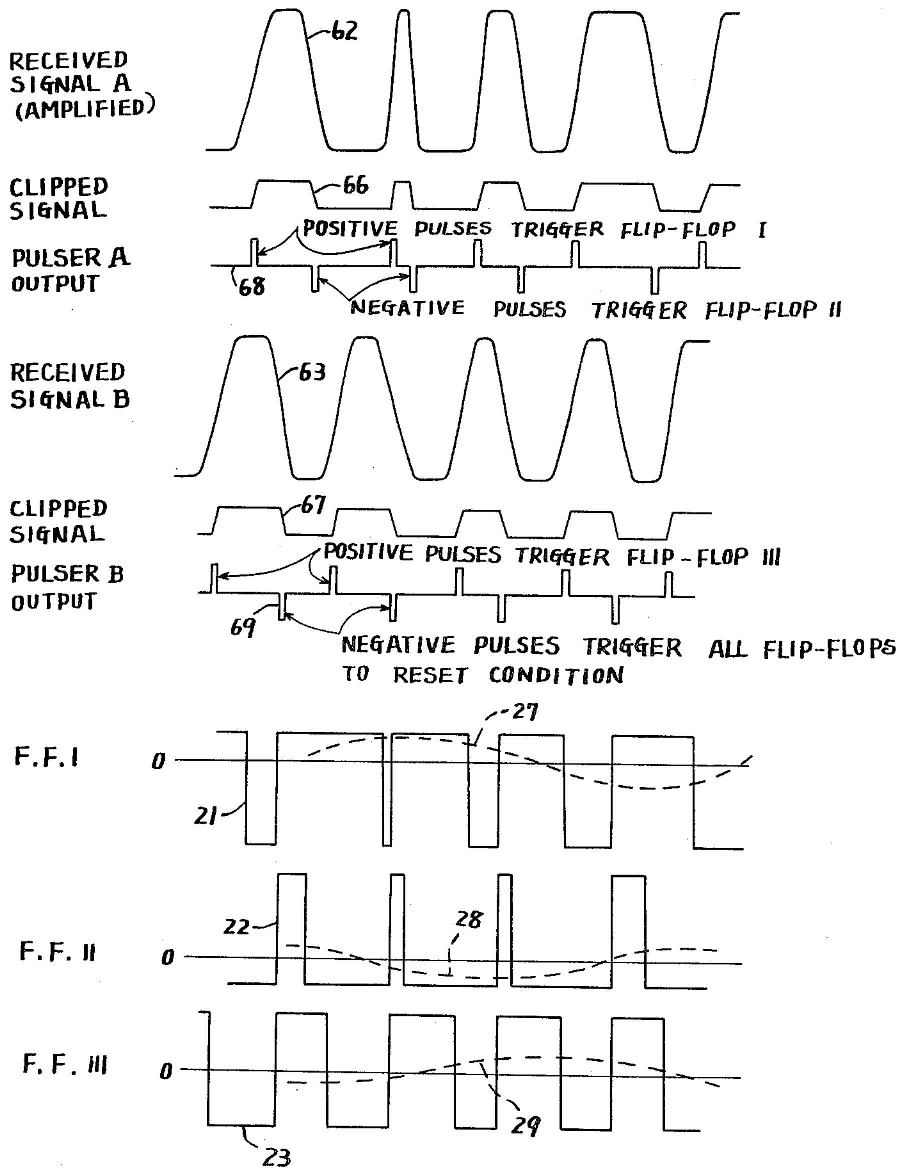
FIGURE 4 is a graph illustrating waveform appearing at various points in the circuit of FIGURE 3.

The reproducing section and its operation are illustrated in FIGURES 3 and 4. After recording of the squarewave signals on separate channels of the tape 18, the tape is driven in a conventional manner past reproducing heads 19 and 20. Signals from heads 19 and 20 are amplified by broad-band amplifiers 60 and 61 to develop signals which may have waveforms as shown by curves 62 and 63 in FIGURE 4. Signals 62 and 63 as shown are not perfect squarewaves and such is generally the case due to limitations in the performance of recording-reproducing systems. However, as will appear, the system nevertheless operates satisfactorily. Signals 62 and 63 from the amplifiers 60 and 61 are applied to "A" and "B" pulsers 64 and 65. The pulsers 64 and 65 may comprise conventional limiter-clipper circuits to develop clipped signals having waveforms as indicated by reference numerals 66 and 67 in FIGURE 4. The clipped signals are applied to differentiating circuits to develop pulse outputs 68 and 69 as shown in FIGURE 4. Each output, of course, contains both positive and negative pulses. The phase of the positive pulses is controlled by the leading edge of the applied signal while the phase of the negative pulses is controlled by the trailing edge of the applied signal. The positive pulses from pulser 64 are applied to the flip-flop I, while the negative pulses from pulser 64 are applied to the flip-flop II. The positive pulse from pulser 65 are applied to the flip-flop III. The negative pulses from pulser 65 may be applied through a switch contact 70 to all three flip-flops I, II and III.

In operation, flip-flop I is triggered to one condition by positive pulses from pulser 64 and is triggered to its opposite condition by the reference negative pulses from the pulser 65. In this way, an output signal is obtained from flip-flop I, corresponding to the amplitude of the original input signal I. The output of flip-flop I is shown by curve 21 in FIGURE 4 and after it is applied through the averaging or filter circuit 24, a signal is developed having a waveform such as indicated by dotted line 27 in FIGURE 4, corresponding to the waveform 11 of the original input signal I.

Similarly, flip-flop II is triggered to one condition by negative pulses from the pulser 64 and to its opposite condition by negative pulses from the pulser 65, thereby developing the waveform 22 which is applied to the filter or averaging circuit 25 to develop an output signal as indicated by dotted line 28.

In like fashion, flip-flop III is triggered to one condition by positive pulses from pulser 65 and to its opposite condition by negative pulses from the pulser 65, to develop output signal 23 which is applied to the filter and averaging circuit 26 to develop the output signal indicated by dotted line 29.

It will be noted that with reference pulses from the pulser 65 being applied to the flip-flops I and II, it is desirable that such reference pulses should be developed at times intermediate the positive and negative pulses from the pulser 64. This relationship is obtained by properly phasing the carrier wave signals applied to the pulse width modulator 40 with respect to the carrier wave signals applied to the pulse-phase modulators 32 and 33, as noted above. If desired, however, the switch 70 may be switched to a position to connect the flip-flops I, II and III to a pulse generator 71 which is triggered by negative pulses from the pulser 65. The pulse generator 71 may be used to generate pulses at any desired time relationship to the reference negative pulses developed by the pulser 65.

This invention thus provides a transmission system having many advantages, particularly as embodied in a multiplex magnetic recording and reproducing system, and also provides a record medium having signals stored thereon in a highly advantageous fashion. It is important to note that amplitude variations and extraneous signals have little effect on the portions of the system used to transmit the squarewave signals from the generator thereof to the point where they are converted to reproduce the original input signals. The method of generation of the squarewave signals and the method of converting such signals into signals of varying amplitude also form important features. Both are highly accurate and reliable in operation, and yet there are no critical or precision components required, and the system can be produced economically.

It may be noted that the squarewaves produced by the flip-flop 37 and applied to the "A" channel recording head 16 in response to signals from sources I and II may be considered to be pulse width modulated waves, since the width of duration of the waves varies. However, unlike conventional pulse width modulated waves, the pulse width modulated waves produced by the flip-flop 37 and transmitted through the recording and reproducing system, cannot be directly demodulated by passing through a filter. It is necessary to use a reproducing system as disclosed above wherein a reference signal is employed which is not affected by instantaneous variations in the phase of the leading and trailing edges.

It is also noted that the term "leading edge" and the term "trailing edge" have herein been applied to the positive-going and negative-going edges of the waves, but this terminology has been employed for convenience only and should not be construed as constituting a limitation.

It will be understood that modifications and variations may be effected without departing from the spirit and scope of the novel concepts of this invention.

We claim as our invention:

1. A multiplex magnetic recording and reproducing system comprising a reference signal source, two input signal circuits, two pulse-phase modulation circuits coupled to said reference signal source and to said input signal circuits to produce two pulse signals shifted in phase in relation to the reference signal in accordance with the amplitude of the signals from said input signal circuits, a common flip-flop circuit responsive to said pulse signals to be triggered thereby and to produce a squarewave signal having leading and trailing edges respectively controlled in phase by said pulse signals, means for recording said squarewave signal on a magnetic medium, means for reproducing said squarewave signal from said magnetic medium, pulser means responsive to the reproduced squarewave signal for producing a pair of pulse-phase modulated signals corresponding to the leading and trailing edges of the reproduced squarewave, a second reference signal source, a pair of flip-flop circuits responsive to said pair of pulse-phase modulated signals and to said second reference signal for producing a pair of pulse width modulated signals, and a pair of filters for respectively demodulating said pulse width modulated signals.

2. A multiplex magnetic recording and reproducing system comprising a reference signal source, three input signal circuits, two pulse-phase modulation circuits coupled to said reference signal source and to two of said three input signal circuits to produce two pulse signals shifted in phase in relation to the reference signal in accordance with the amplitude of the signals from said two of said three input signal circuits, a common flip-flop circuit responsive to said two pulse signals to be triggered thereby and to produce a first squarewave signal having leading and trailing edges respectively controlled in phase by said pulse signals, means including a first magnetic head for recording said squarewave signal on a magnetic medium, a pulse width modulation circuit coupled to said reference signal source and to the other input signal circuit for producing a second squarewave in which one edge thereof is shifted in phase in accordance with the amplitude of the signal from said other input signal circuit, means including a second magnetic head for recording said second squarewave on said magnetic medium, means including a first reproducing magnetic head for reproducing said first squarewave signal, means including a second reproducing magnetic head for reproducing said second squarewave signal, pulser means responsive to the first reproduced squarewave signal to reproduce a pair of pulse-phase modulated signals, a second reference signal source, a pair of flip-flop circuits coupled to said second reference signal source and to said pulser means to produce a pair of pulse width modulated signals, a pair of filters for respectively demodulating said pulse width modulated signals, means including a second reproducing magnetic head for reproducing said second squarewave signal, another pulser means for converting the reproduced second squarewave to a pulse-phase modulated signal, another flip-flop circuit connected to the output of said another pulser and to said second reference signal source for producing a third pulse width modulated signal, and a filter for demodulating said third pulse width modulated signal.

3. In a signal transmission system, a reference signal source, three input signal circuits, two pulse-phase modulation circuits coupled to said reference signal source and to two of said three input signal circuits to produce two pulse signals shifted in phase in relation to the reference signal in accordance with the amplitude of the signals from said two of said three input signal circuits, means responsive to said pulse signals to produce a first squarewave signal having leading and trailing edges respectively controlled in phase by said pulse signals, and a pulse width modulation circuit coupled to the other input signal circuit and to said reference signal source to produce a second squarewave signal having first edges controlled in phase by said reference signal and having second edges controlled in phase in relation to said reference signal in accordance with the amplitude of the signal from said other of said input signal circuits.

4. In a signal conversion system for responding to a squarewave signal having leading and trailing edges, pulser means for responding to said squarewave signal to develop a pair of pulse signals modulated in phase in accordance with variations in phase of said leading and trailing edges, means for developing a reference signal, and a pair of means responsive to said reference signal and to said pair of pulse signals to develop a pair of pulse width modulated signals.

5. In a signal conversion system for responding to a plurality of squarewave signals each having leading and trailing edges, a plurality of pulser means responsive to said squarewave signals to develop a plurality of pairs of pulse signals modulated in phase in accordance with the variations in phase of said leading and trailing edges, means for utilizing one of said pulse signals to obtain a reference signal, and a plurality of means responsive to said reference signal and to each of the other pulse signals to develop a pulse width modulated signal in response to each of said other pulse signals.

6. In a signal conversion system for responding to a squarewave signal having leading and trailing edges, pulser means responsive to said squarewave signal to develop a pair of pulse signals modulated in phase in accordance with variations in phase of said leading and trailing edges, means for developing a reference signal, and a pair of flip-flops responsive to said reference signal and to said pulse signals to be triggered thereby and to develop a pair of pulse width modulated signals.

7. In a signal conversion system for responding to a plurality of squarewave signals each having leading and trailing edges, a plurality of pulser means responsive to said squarewave signals to develop a plurality of pairs of pulse signals modulated in phase in accordance with variations in phase of said leading and trailing edges, a plurality of flip-flops, means for applying one of said pulse signals to all of said flip-flops to trigger said flip-flops to a certain condition, and means for respectively applying the other pulse signals to said flip-flops to respectively trigger said flip-flops to the opposite condition and to develop a pulse width modulated signal corresponding to each of said other pulse signals.

8. A multiplex magnetic recording and reproducing system comprising: plural input signal circuits, a carrier oscillator, a first means for producing pulse-phase modulator signals coupled to said carrier oscillator and to said input signal circuits, a second means for producing pulse-width modulated signals having leading and trailing edges respectively controlled in phase by coupling with a pair of signals of said first means, a third means coupled to said carrier oscillator for producing a squarewave signal in which one of leading or trailing edges is provided for a reference signal, a fourth means for recording said pulse-width modulated signals and said squarewave signal on a magnetic medium at the same time; a fifth means for reproducing said pulse-width modulated signals and said squarewave signal from said magnetic medium, a sixth means responsive to the reproduced pulse signals for producing pulse-phase modulated signals corresponding to said leading and trailing edges of said width modulated signals, a seventh means responsive to said squarewave signal for reproducing said reference signal, an eighth means for converting said pulse-phase modulated signals of said sixth means to pulse-width modulated signals coupled to said sixth means and to said seventh means, a ninth means for demodulating said pulse-width modulated signals of said eighth means.

References Cited by the Examiner

UNITED STATES PATENTS

| | | | |
|---|---|---|---|
| 2,513,308 | 7/50 | Grieg | 179—15 |
| 2,514,148 | 7/50 | Baeyer | 179—15 |
| 2,656,524 | 10/53 | Gridley | 179—15 |
| 3,009,025 | 11/61 | Takayanagi | 179—100.2 |

OTHER REFERENCES

Magnetic Tape Instrumentation by G. L. Davis, copyright 1961, by McGraw-Hill Book Co., Inc., pages 46–51.

IRVING L. SRAGOW, *Primary Examiner.*

DAVID G. REDINBAUGH, BERNARD KONICK, *Examiners.*